United States Patent Office 3,277,599
Patented Oct. 11, 1966

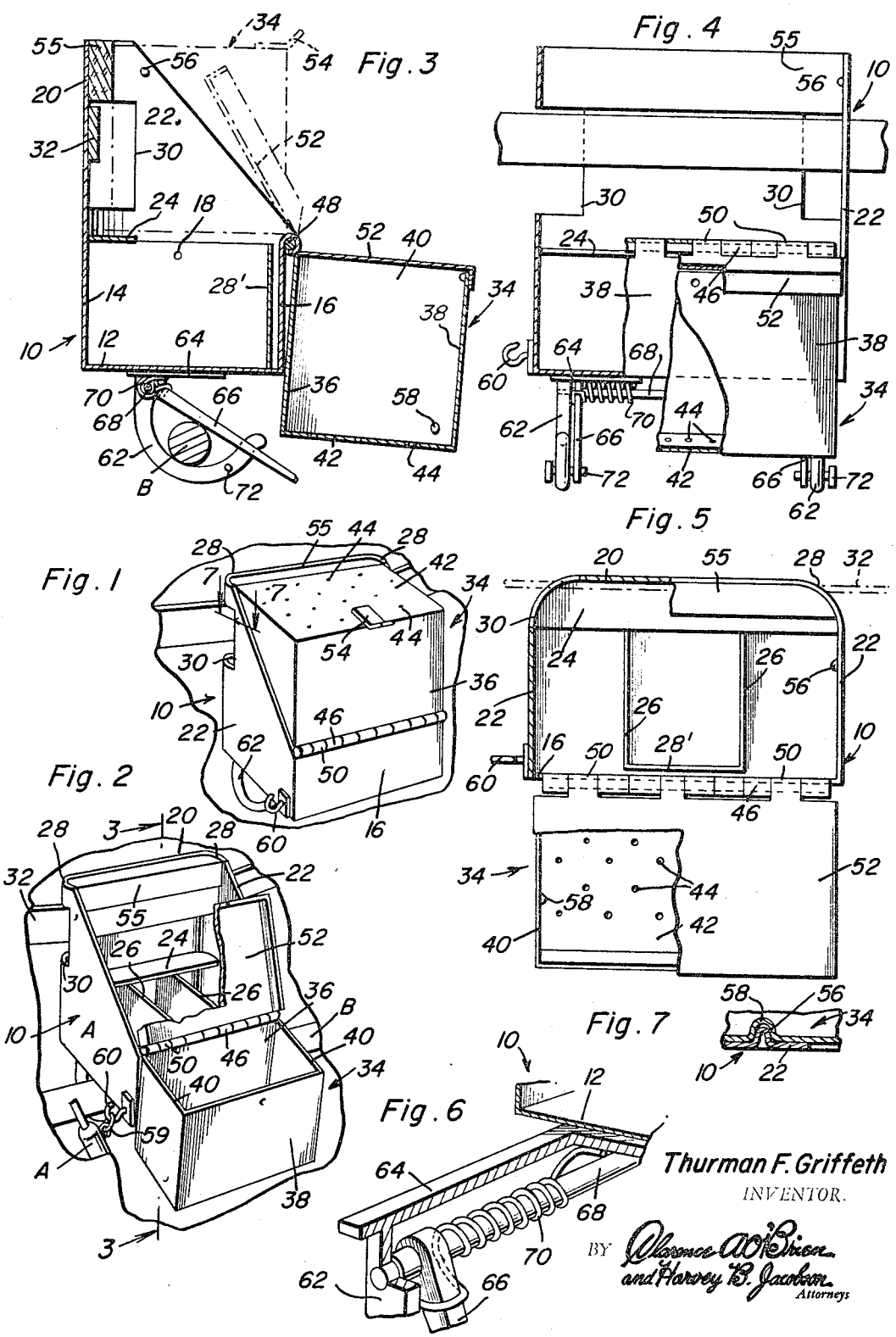

3,277,599
BELT-SUPPORTED ANGLER'S KIT
Thurman F. Griffeth, Preston, Idaho
Filed Oct. 7, 1964, Ser. No. 402,178
6 Claims. (Cl. 43—55)

The present invention relates to an angler's kit which is functionally designed and structurally adapted to be carried on the person and which, more particularly stated, is provided with means whereby it may be conveniently attached to and reliably supported on the waist-encircling belt of the user.

The invention features, as will be hereinafter pointed out, a simple and practical dual box arrangement; namely, a main or primary box and a complemental supplemental or auxiliary box. The primary box is held and strapped in placed by the angler's belt and has two compartments, a lower compartment for accessible retention of limited tackle, and an upper compartment fittingly arranged for storage of the supplemental box. The latter box comprises a self-contained ventilated and cover-equipped container for bait, either live or artifical and, to the ends desired, one wall of the bait box is hingedly mounted on an upper part of the front wall of the primary box whereby to permit the bait box to be folded into the compartment in which it is stowed when not being used.

Stated more specifically, the invention is characterized by a bait box of suitable capacity having a vented bottom and an open top, the latter covered by a hingedly mounted lid. The lid-equipped wall of the bait box resides when in use in contact with the front wall portion of the primary box. Accordingly, when the lid is open and the bait box is in use it is easily seen by the angler and its contents are accessible when the lid is swung up and placed in an open position.

The invention also features a primary box construction wherein the upper half portion is fashioned into the storage compartment for the in-folded out-of-use bait box, the lower compartment provided with divider means for storage of artificial flies, hooks, and small angling items.

Another and significant aspect of the concept has to do with a dual box angler's kit wherein satisfactory means is provided on the bottom of the primary box to support the fishing pole or rod temporarily in a horizontal out-of-the-way position. Alternatively usable means is provided on one vertical side of the primary box which is also available for temporarily attaching and supporting the fishing rod. It follows that with these selectively usable means the angler can use both hands to bait hooks, change lures and attend to the many chores involved when angling.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective showing the dual box belt-supported angler's kit constructed in accordance with the principles of the present invention and showing the bait box folded upwardly and removably lodged in the stowage compartment of the primary or tackle box;

FIGURE 2 is also a view in perspective based on FIGURE 1 and showing the bait box swung out and down in a position of use, with the lid or cover swung up to and assuming an open position and also showing a rod holding eye and how the rod is held in an out-of-the-way position thereon;

FIGURE 3 is a section taken approximately on the plane of the section line 3—3 of FIGURE 2 and wherein the lid or cover of the bait box is shown closed in full lines and swung up to assume an open position in phantom lines;

FIGURE 4 is a view with parts in section and parts in elevation observing FIGURE 3 in a direction from right to left;

FIGURE 5 is a top plan view with parts broken away and other parts appearing in both section and elevation;

FIGURE 6 is an enlarged fragmentary perspective view showing one of the spring-loaded rod holddown fingers;

FIGURE 7 is a view fragmentarily shown and appearing in section and detailing the detent means and taken on the plane of the section line 7—7 of FIGURE 1.

Referring now to the views of the drawing the main or primary box, a suitable sheet material entity, is denoted generally by the numeral 10 and comprises a rectangular lower half-portion embodying a bottom wall 12, a back wall 14, a front wall 16 and end walls 18. It should be noted that the upper portion 20 of the back wall cooperates with triangulate end portions 22 of the end walls in defining an open front sheath, more particularly, a stowage compartment. The lower compartment is preferably but not necessarily provided with an insert characterized by a back horizontal shelf 24 and a pair of spaced parallel walls 26 connected by a web or wall 28' as best shown in FIGURE 5. This divided compartment provides selectively usable cells or pockets for fishing tackle, usually small articles such as fishing flies, fishline hooks, artificial bait including lures. It will be noted in FIGURE 2 that the corner portions between the upstanding back wall 20 and end portions 22 are rounded as at 28. The rounded upper portions are provided with suitable slots 30 for passage of the angler's waist encircling belt 32. It will be evident therefore that the lower half portion of the primary box 10 is suitably divided or partitioned and provides a feasible tackle box. The upper half portion provides the open top and open front stowage space or compartment for the hinged folding supplemental or auxiliary box 34 which is also distinguished as a bait box. This bait box is generally rectangular and embodies a side wall 36 opposed to a similar side wall 38, these walls being connected by end walls 40. The "bottom" wall 42 as shown in FIG. 3 is provided with ventilating orifices or holes 44. This auxiliary bait box is of a size and shape that it can be folded up and stowed away temporarily, of course, in the upper stowage compartment of the primary box 10. To accomplish this the upper edge of the wall 36 is provided with attaching and hinging knuckles 46 mounted on a hinge pintle 48 which permits the box 34 to fold in and out in a self-evident manner. The hinge pintle also serves to accommodate similar hinging knuckles 50 provided on an edge of a suitably flanged lid or cover 52 which can be closed as shown in full lines in FIG. 1 or swung up and open as shown in full lines in FIG. 2 and phantom lines in FIG. 3. The bottom 42 is provided with a fixed thumb clip 54 which may be conveniently used when one desires to press down on the same and in this manner assist in opening up and swinging out the bait box to the down and opened position illustrated for example in FIG. 2. It will be noted that the numeral 55 designates an optionally usable insert comprising a block of cork (or suitably equivalent material) which can be used in any convenient manner for hanging the barbed bills of ready-to-use fishhooks (not shown) thereon whenever necessary or desired. It will further be noted that the upper inclined edge portions of the walls 22 are provided with suitably projecting detents 56 for reception in keeper seats 58 (see FIG. 7) on the end walls of the box to assist in snapping and retaining the box in an up or folded position.

Attention is directed now to the fishing pole or rod A which, as shown in FIGURE 2, is provided with a hanger-ring 59 vertically disposed and suspended by an upwardly opening hanger hook 60. There may be one such hook 60, as suggested in the views of the drawing or, if the manufacturer prefers, hooks may be applied to the right and left walls respectively preferably near the bottom of the tackle compartment of the primary box 10. In addition it is desired to provide means on the bottom of the primary box which can be used in lieu of the hook means 60 and which serves to support the fishing rod or pole B in a suspended horizontal position. To accomplish this two hook-shaped brackets 62 are provided. These brackets include attaching cleats 64 which are superimposed on and secured to the exterior of the bottom 12 as shown in FIGURES 3, 4 and 6. The bill portions of the hooks project forwardly but are spaced below the bottom 12 to permit the rod to be readily placed in position and removed. When the rod is in place as shown in FIGS. 2 and 3 it is conveniently out of the way so that the angler has both hands free to bait hooks, change lures and perform similar chores. As a further feature spring loaded holddown fingers 66 may be employed. To accomplish this there is a shaft 68 (see FIG. 6) which is horizontally mounted and the fingers 66 are hinged thereon and are spring loaded by way of the cooperating coil springs one of which is denoted at 70 in FIG. 6. The spring serves to press the fingers down atop the rod B and when the rod is not in the position shown the spring fingers are checked by way of stop pins 72 carried by the bill portions of the fixed hooks. It follows that the angler can position the rod vertically as shown at A in FIG. 2. Also if he prefers he can resort to the use of the hanger hooks 62 and support the rod horizontally. In the latter position it is necessary to release the spring biased or spring loaded fingers 66 to permit the rod B to be applied and removed.

It will be noted in connection with FIG. 2 that the free end portion of the fingers 66 may be extended well beyond the bill portions of the hooks so that the user can place the fishing rod beneath the free ends of the fingers, then lift up and in this manner readily seat the rod in the curved portions of the hooks 62. It is also significant that with the spring loaded arms individually spring biased each operating independently of the other the angler may make the proper closure or grip on the large and small portions of the fishing rod in an evident manner.

It will be evident that the ventilating holes 44 in the "bottom" of the bait box must be small enough that worms cannot escape therethrough. There is a space between the belt slots 30 which determines the area of the extended upper portion of the back wall upon which stress or pull is concentrated and which stress in turn causes inward pressure. Consequently the auxiliary bait box is firmly held in closed position when the kit is mounted on the belt. The only way it can be released is by inward pressure on the front of the kit just below the hinge means. The sheet metal or other sheet material from which the box is made should be slightly resilient to provide the inherent bend desired. It will also be clear that the kit can be opened forcibly. Normally, stooping and bending of the angler holds the kit very tightly closed, much more so than when he is walking or standing.

It will be further noted that the bait box 34 when stowed away is inverted and the cover or lid 52 becomes then a cover for the lower divided compartment of the main box 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A portable belt-supported angler's kit comprising, in combination, a relatively deep primary box having an inwardly disposed vertical wall, vertical end walls joined by rounded corners thereto and a front wall, said first-named wall being bendably resilient and said rounded corner portions having registering belt slots for passage of a body encircling and supporting belt, said end walls having upper edges inclined outwardly and downwardly to said front wall, said walls together providing a lower compartment and an upper compartment, said lower compartment being divided and adapted to accommodate miscellaneous tackle, the upper compartment being adapted for stowage, a second box having one wall thereof hinged on said front wall of said primary box, said second box adapted to contain artificial and live bait and being foldable upwardly and inwardly into said upper stowage compartment.

2. A portable belt-supported angler's kit comprising, in combination, a relatively deep primary box having an inwardly disposed vertical wall, vertical end walls joined by rounded corners thereto and a front wall, said first-named wall being bendably resilient and said rounded corner portions having registering belt slots for passage of a body encircling and supporting belt, said end walls having upper edges inclined outwardly and downwardly to said front wall, said walls together providing a lower compartment and an upper compartment, said lower compartment being divided and adapted to accommodate miscellaneous tackle, the upper compartment being adapted for stowage, a second box having one wall thereof hinged on said front wall of said primary box, said second box adapted to contain artificial and live bait and being foldable upwardly and inwardly into said upper stowage compartment, and having a hingedly mounted lid and an apertured bottom.

3. A portable belt-supported angler's kit comprising, in combination, a relatively deep primary box having an inwardly disposed vertical wall, vertical end walls joined by rounded corners thereto and a front wall, said first-named wall being bendably resilient and said rounded corner portions having registering belt slots for passage of a body encircling and supporting belt, said end walls having upper edges inclined outwardly and downwardly to said front wall, said walls together providing a lower compartment and an upper compartment, said lower compartment being divided and adapted to accommodate miscellaneous tackle, the upper compartment being adapted for stowage, a second box having one wall thereof hinged on said front wall of said primary box, said second box adapted to contain artificial and live bait and being foldable upwardly and inwardly into said upper stowage compartment, and having a hingedly mounted lid and an apertured bottom, said primary and second boxes having coacting wall surfaces provided with releasable cooperable detents.

4. The structure defined in claim 3 and wherein said primary box is provided with selectively usable means through the medium of which a fishing pole or fishing rod may be suspended either horizontally or vertically, at will, whereby the hands of the angler will be free for baiting hooks, adjusting tackle and so on.

5. An angler's kit comprising, in combination, a first box having a bottom wall, front and back walls, and end walls, said back wall extending at the upper portion thereof to a plane above the upper edge of the front wall, the end walls having portions of a height equal to the height of the extended part of the back wall and having forwardly and downwardly inclined upper edges, junctional corner portions between the back wall and end walls having belt accommodating slots, means on the lower portion of said box for removably suspending a rod in either its vertical or horizontal position, a lower portion of said box constituting a tackle compartment and the upper portion constituting a stowage compartment, and a second box, said second box constituting a bait box, being normally confined in an inverted position substantially within the confines of the upper stowage compartment and having a portion thereof hingedly mounted on the upper edge of the front wall of the first box whereby to permit the second box to be swung in and out of the upper stowage compartment depending on the requirements of the user.

6. The structure defined in claim 5 and wherein said second box has a perforated bottom wall, is open at its top and provided at its top with a hinged lid constituting a cover.

References Cited by the Examiner
UNITED STATES PATENTS

| | | | |
|---|---|---|---|
| 515,899 | 3/1894 | Breithaupt | 43—55 X |
| 904,545 | 11/1908 | Madeira | 206—16 |
| 2,153,549 | 4/1939 | Cooper | 43—54.5 |
| 2,555,073 | 5/1951 | Zdankoski | 43—55 |
| 2,936,066 | 5/1960 | Meksula | 206—16 |
| 3,113,817 | 12/1963 | Imel | 312—199 |
| 3,148,811 | 9/1964 | Foltz | 224—5 |

SAMUEL KOREN, *Primary Examiner.*

W. H. CAMP, *Assistant Examiner.*